(12) United States Patent
Hall et al.

(10) Patent No.: US 9,824,288 B1
(45) Date of Patent: Nov. 21, 2017

(54) PROGRAMMABLE OVERLAY FOR NEGOTIABLE INSTRUMENT ELECTRONIC IMAGE PROCESSING

(71) Applicant: BANK OF AMERICA CORPORATION, Charlotte, NC (US)

(72) Inventors: John B. Hall, Charlotte, NC (US); Deborah A. Copes, Wethersfield, CT (US); Bethany M. Axtell, Ravena, NY (US); Milton A. Danielson, New Castle, DE (US); Melody L. Gentile, Newark, DE (US); Kerry Kurt Simpkins, Fort Mill, SC (US)

(73) Assignee: BANK OF AMERICA CORPORATION, Charlotte, NC (US)

( * ) Notice: Subject to any disclaimer, the term of this patent is extended or adjusted under 35 U.S.C. 154(b) by 85 days.

(21) Appl. No.: 15/146,626

(22) Filed: May 4, 2016

(51) Int. Cl.
*G06K 9/00* (2006.01)
*G06K 9/20* (2006.01)
*G06K 9/18* (2006.01)

(52) U.S. Cl.
CPC ....... *G06K 9/2054* (2013.01); *G06K 9/00449* (2013.01); *G06K 9/00469* (2013.01); *G06K 9/186* (2013.01)

(58) Field of Classification Search
CPC .. G06K 9/2054; G06K 9/00449; G06K 9/186; G06K 9/00469
See application file for complete search history.

(56) References Cited

U.S. PATENT DOCUMENTS

| | | | |
|---|---|---|---|
| 5,821,929 A | 10/1998 | Shimizu et al. | |
| 5,960,448 A | 9/1999 | Reichek et al. | |
| 6,043,823 A | 3/2000 | Kodaira et al. | |
| 6,453,079 B1 | 9/2002 | McInerny | |
| 8,494,280 B2 | 7/2013 | Nagarajan et al. | |
| 9,256,798 B2 | 2/2016 | Walker et al. | |
| 2013/0191720 A1* | 7/2013 | Simons | G06F 17/30882 715/234 |
| 2015/0071542 A1 | 3/2015 | Dahl et al. | |

* cited by examiner

*Primary Examiner* — Siamak Harandi
(74) *Attorney, Agent, or Firm* — Michael A. Springs; Moore & Van Allen PLLC; Nicholas C. Russell (57) ABSTRACT

Embodiments of the invention include systems, methods, and computer-program products for generating an overlay of a highlight or mask of a negotiable instrument on a representative's display for keying the instrument. The system overlays and changes the display of a representative's computer screen in real-time for improved keying instruments by generating highlighting or masking of specified portions of the instrument. The invention generates a grid including an X and Y axis on the instrument and identifies the parameter coordinates for the various indicia on the instrument. The invention may contain code for highlighting or masking various indicia on the instrument using the parameter coordinates for mapping. A programmed overlay may be performed on an image of the instrument in real-time as it is queued onto a representative's display. Upon completion of the representative's keying of the instrument, the overlay is removed for storage of the image of the instrument.

20 Claims, 9 Drawing Sheets

PROGRAMMABLE OVERLAY FOR NEGOTIABLE INSTRUMENT ELECTRONIC IMAGE PROCESSING

BACKGROUND

Entities typically receive large volumes of documents from vendors, customers, or employees on any given day. Each document, especially if it is a negotiable instrument, is typically reconciled with an account associated with the document. In this way, specific characteristics of a document are matched to a corresponding account. During this process, individuals may identify a match. Alternatively, sometimes no match can be made between the document and a corresponding account. As such, when an exception occurs, an individual may have to look to other characteristics of the document for reconciliation purposes.

BRIEF SUMMARY

Embodiments of the present invention address the above needs and/or achieve other advantages by providing apparatuses (e.g., a system, computer program product and/or other devices) and methods for generating an overlay of a highlight or mask of a negotiable instrument on a display for keying the instrument. In this way, the system is necessarily rooted in computer technology and improves the display of a representative for keying in information about the instrument. The system overlays and changes the display of a computer screen for improvement of keying instruments by highlighting or masking portions of the display in real-time.

The invention may identify indicia on the negotiable instrument, such as a check. The system may scan the negotiable instrument and perform optical character recognition to identify the various indicia on the negotiable instrument. The indicia includes data related to the payor, payment accounts, or payee. An X and Y axis of the negotiable instrument is generated and coordinates for the various indicia are identified and stored.

In some embodiments, the system may code specific negotiable instruments to have a highlight over an area of focus for the viewer. In other embodiments, the system may code specific negotiable instruments to mask, such as with a gray or black out box over one or more indicia on the negotiable instrument. In other embodiments, the system may code specific negotiable instruments to blur one or more indicia on the negotiable instrument. Furthermore, the system may perform one or more of these functions at the same time and to the same negotiable instrument.

In some embodiments, the keying of negotiable instruments may identify exceptions in the processing of the negotiable instrument. The exceptions may include one or more irregularities such as bad micro line reads, outdated check stock, or misrepresentative indicia points on a negotiable instrument that may result in a failure to match the check to an account for processing. Payment instrument or negotiable instrument exception processing allows decisions for exception processing to systematically resolve exceptions.

In some embodiments, the system may receive images of negotiable instruments from one or more sources. The negotiable instruments may be received from within an entity, from other financial institutions, or the like. In some embodiments, the documents include images of checks or other financial documents captured by an account holder or other entity. From the received negotiable instruments or payment instruments, the system may detect an X and Y axis of the negotiable instrument as well as coordinates associated with various indicia. This indicia may include any data point, written or printed, on the front or back of the negotiable instrument. The negotiable instruments may include a myriad of financial documents, including but not limited to checks, lease documents, mortgage documents, deposit slips, payment coupons, receipts, general ledger tickets, or the like.

In the present invention, once the negotiable instrument is received, the invention may code various indicia associated with the negotiable instrument for highlighting, masking, or blurring. The indicia associated with the negotiable instrument may include data related to the payor, related to the payor account, or related to the payee. The negotiable instrument may be placed in a queue of a representative for keying the amounts and/or critical elements of the negotiable instrument.

Prior to being presented to the representative, the system may identify the system coding for the X, Y axis for the indicia of the negotiable instrument desired to be highlighted and/or masked and perform the programmed overlay to those coordinates upon presentation of the negotiable instrument on the representative's display for keying.

After keying, the system may remove the highlight and/or mask from the negotiable instrument image for storage and retention. Upon redisplaying of the negotiable instrument, the system may add the highlight and/or mask.

Embodiments of the invention relate to systems, methods, and computer program products for receiving an image of a negotiable instrument and position the image of the negotiable instrument in queue for representative keying; generating a grid of the negotiable instrument; identifying axis coordinates for one or more parameter points of indicia on the image of the negotiable instrument; identifying focus indicia for a representative of the image of the negotiable instrument; presenting on a display, in real-time upon being queued, an overlay of the image of the negotiable instrument, wherein the overlay comprises a highlight to or mask of the focus indicia and is positioned as an overlay over the image of the negotiable instrument based on the axis coordinates for the one or more parameter points of the focus indicia; allowing representative keying of the image of the negotiable instrument with the overlay highlight or mask over the focus indicia; and removing the overlay upon completion of keying and store the image of the negotiable instrument and axis coordinates for the one or more parameter points of the indicia without the overlay.

In some embodiments, the invention further comprises coding, based on identification of a type of negotiable instrument the image of a negotiable instrument is, the overlay as being the highlight or the mask of the focus indicia.

In some embodiments, the mask of the focus indicia comprises a burr or block completely covering the focus indicia, such that the focus indicia is not visible by the representative on the display. In some embodiments, the highlight of the focus indicia comprises a highlight box visually attracting the focus indicia to the representative on the display.

In some embodiments, the axis coordinates are an X and Y axis point based on the generated grid of the negotiable instrument that identify one or more outside parameter points for each of the indicia located on a front and a back of the negotiable instrument.

In some embodiments, the invention further comprises identifying the indicia on the image of the negotiable instrument as areas on the negotiable instrument comprising non-public information, signatures, account numbers, routing numbers, and legal tender lines.

In some embodiments, receiving an image of the negotiable instrument further comprises generating an image of a paper version of the negotiable instrument in a format for optical character recognition.

In some embodiments, the mask is applied over focus indicia that includes non-public information, wherein the mask is applied over the axis coordinates for one or more parameter points of focus indicia that includes non-public information completely covering the non-public information. In some embodiments, the highlight is applied over focus indicia that includes a legal tender line, wherein the highlight is applied over the axis coordinates for one or more parameter points of focus indicia that includes the legal tender line highlighting the legal tender line for representative keying.

The features, functions, and advantages that have been discussed may be achieved independently in various embodiments of the present invention or may be combined with yet other embodiments, further details of which can be seen with reference to the following description and drawings.

BRIEF DESCRIPTION OF THE DRAWINGS

Having thus described embodiments of the invention in general terms, reference will now be made to the accompanying drawings, wherein:

DETAILED DESCRIPTION OF EMBODIMENTS OF THE INVENTION

Embodiments of the present invention will now be described more fully hereinafter with reference to the accompanying drawings, in which some, but not all, embodiments of the invention are shown. Indeed, the invention may be embodied in many different forms and should not be construed as limited to the embodiments set forth herein; rather, these embodiments are provided so that this disclosure will satisfy applicable legal requirements. Like numbers refer to elements throughout. Where possible, any terms expressed in the singular form herein are meant to also include the plural form and vice versa, unless explicitly stated otherwise. As used herein, a "document," "negotiable instrument," "financial document," of "check" may also refer to a myriad of negotiable instrument documents, including but not limited to a lease document, checks, a mortgage document, a deposit slip, a payment coupon, a receipt, general ledger tickets, payments, deposits, customer correspondence, or the like. In some embodiments, "negotiable instrument" may exist as a physical item printed on paper or other medium. In other embodiments, the check may exist electronically. Furthermore, "negotiable instrument" may also refer to records associated with government data, legal data, identification data, and the like. The "negotiable instrument" may also include supporting documents supportive of the myriad of negotiable instrument documents, including but not limited to a lease document, checks, a mortgage document, a deposit slip, a payment coupon, a receipt, general ledger tickets, payments, deposits, customer correspondence, or the like. Although the disclosure is directed to negotiable instruments, it will be understood that non-financial records such as social communications, advertising, blogs, opinion writing, and the like may also be applicable to the disclosure presented herein. In cases were non-financial records are use, it will be understood that personal information, such personal identifying information, account numbers, and the like, can be removed from the documents before they are released. For example, if a coupon or product review is to be used in advertising, personal information associated with such records will be removed before the advertising is presented to the public. The data of the financial records or non-financial records may be provided in a wide variety formats including, paper records, electronic or digital records, video records, audio records, and/or combinations thereof. In some embodiments, the "negotiable instrument" may be referred to in examples as a check or the like. Furthermore, the term "image lift data" or "data lift" may refer to the process of lifting one or more areas/elements of a document and storing those areas as metadata without storing the entire document as an image file. Furthermore, in some embodiments the term indicia may refer to any text, illustration, writing, or the like on the negotiable instrument. In this way, indicia may include any information in a grouping on a negotiable instrument, such as check information, such as contact information, the payee, the memo description, the account number, routing number, user or customer account, the date, the check number, the amount of the check, the signature, or the like. In some embodiments, the indicia information may comprise text. In other embodiments, the indicia may comprise an image.

In some embodiments, the invention identifies and utilizes the X, Y coordinates of a negotiable instrument generated as a scan via optical character recognition to programmatically overlay or draw a box over a focus area that is in need of focus for a representative for keying. In some embodiments, the system may highlight for focus a legal amount field of a check. In other embodiments, the system may mask non-public information on checks or other negotiable instruments. In this way, the system may mask, such as black out, blur, or the like the remitter or payer name on the check. In cases where representatives are tasked with keying amounts, the system has the ability to keep the data entry representatives from seeing non-public information or other information on the negotiable instrument.

In some embodiments, the system may receive images of negotiable instruments from one or more sources. The negotiable instruments may be received from within an entity, from other financial institutions, or the like. In some embodiments, the documents include images of checks or other financial documents captured by an account holder or other entity. From the received negotiable instruments or payment instruments, the system may detect an X and Y axis of the negotiable instrument as well as coordinates associated with various indicia. This indicia may include any data point, written or printed, on the front or back of the negotiable instrument. The negotiable instruments may include a myriad of financial documents, including but not limited to checks, lease documents, mortgage documents, deposit slips, payment coupons, receipts, general ledger tickets, or the like.

In the present invention, once the negotiable instrument is received, the invention may code various indicia associated with the negotiable instrument for highlighting, masking, or blurring. The indicia associated with the negotiable instrument may include data related to the payor, related to the payor account, or related to the payee. The negotiable instrument may be placed in a queue of a representative for keying the amounts and/or critical elements of the negotiable instrument.

Prior to being presented to the representative, the system may identify the system coding for the X, Y axis for the indicia of the negotiable instrument desired to be highlighted and/or masked and perform the programmed overlay to those coordinates upon presentation of the negotiable instrument on the representative's display for keying.

After keying, the system may remove the highlight and/or mask from the negotiable instrument image for storage and retention.

Figure 1:
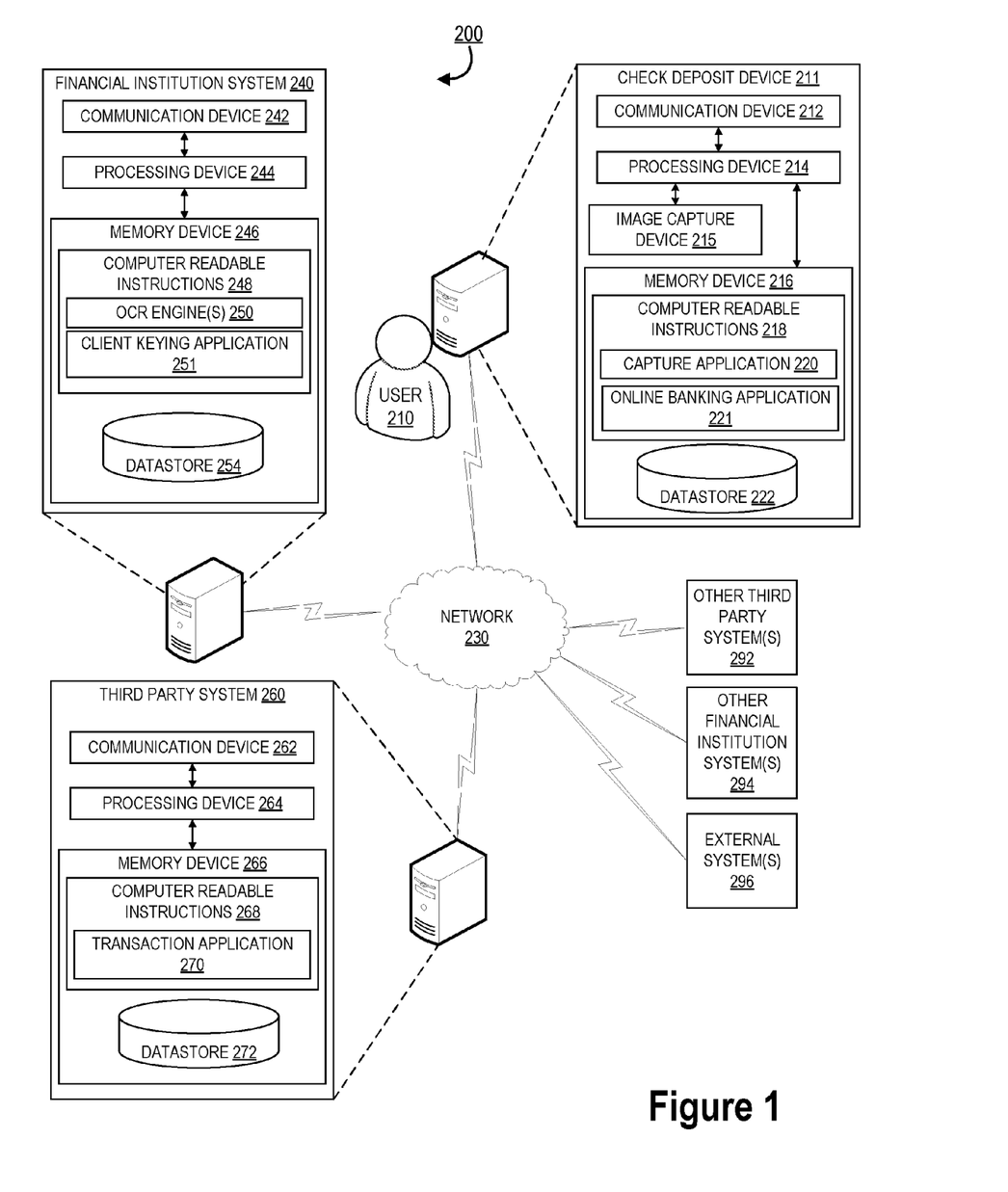
FIG. 1 provides a negotiable instrument overlay system environment, in accordance with one embodiment of the present invention.

FIG. 1 illustrates a negotiable instrument overlay system environment 200, in accordance with some embodiments of the invention. The environment 200 includes a check deposit device 211 associated or used with authorization of a user 210 (e.g., an account holder, a mobile application user, an image owner, a bank customer, and the like), a third party system 260, and a financial institution system 240. In some embodiments, the third party system 260 corresponds to a third party financial institution. The environment 200 further includes one or more third party systems 292 (e.g., a partner, agent, or contractor associated with a financial institution), one or more other financial institution systems 294 (e.g., a credit bureau, third party banks, and so forth), and one or more external systems 296.

The systems and devices communicate with one another over the network 230 and perform one or more of the various steps and/or methods according to embodiments of the disclosure discussed herein. The network 230 may include a local area network (LAN), a wide area network (WAN), and/or a global area network (GAN). The network 230 may provide for wireline, wireless, or a combination of wireline and wireless communication between devices in the network. In one embodiment, the network 230 includes the Internet.

The check deposit device 211, the third party system 260, and the financial institution system 240 each includes a computer system, server, multiple computer systems and/or servers or the like. The financial institution system 240, in the embodiments shown has a communication device 242 communicably coupled with a processing device 244, which is also communicably coupled with a memory device 246.

The processing device 244 is configured to control the communication device 242 such that the financial institution system 240 communicates across the network 230 with one or more other systems. The processing device 244 is also configured to access the memory device 246 in order to read the computer readable instructions 248, which in some embodiments includes a one or more OCR engine applications 250 and a client keying application 251. The memory device 246 also includes a datastore 254 or database for storing pieces of data that can be accessed by the processing device 244. In some embodiments, the datastore 254 includes a check data repository.

As used herein, a "processing device," generally refers to a device or combination of devices having circuitry used for implementing the communication and/or logic functions of a particular system. For example, a processing device may include a digital signal processor device, a microprocessor device, and various analog-to-digital converters, digital-to-analog converters, and other support circuits and/or combinations of the foregoing. Control and signal processing functions of the system are allocated between these processing devices according to their respective capabilities. The processing device 214, 244, or 264 may further include functionality to operate one or more software programs based on computer-executable program code thereof, which may be stored in a memory. As the phrase is used herein, a processing device 214, 244, or 264 may be "configured to" perform a certain function in a variety of ways, including, for example, by having one or more general-purpose circuits perform the function by executing particular computer-executable program code embodied in computer-readable medium, and/or by having one or more application-specific circuits perform the function.

Furthermore, as used herein, a "memory device" generally refers to a device or combination of devices that store one or more forms of computer-readable media and/or computer-executable program code/instructions. Computer-readable media is defined in greater detail below. For example, in one embodiment, the memory device 246 includes any computer memory that provides an actual or virtual space to temporarily or permanently store data and/or commands provided to the processing device 244 when it carries out its functions described herein.

The check deposit device 211 includes a communication device 212 and an image capture device 215 (e.g., a camera) communicably coupled with a processing device 214, which is also communicably coupled with a memory device 216. The processing device 214 is configured to control the communication device 212 such that the check deposit device 211 communicates across the network 230 with one or more other systems. The processing device 214 is also configured to access the memory device 216 in order to read the computer readable instructions 218, which in some embodiments includes a capture application 220 and an online banking application 221. The memory device 216 also includes a datastore 222 or database for storing pieces of data that can be accessed by the processing device 214. The check deposit device 211 may be a mobile device of the user 210, a bank teller device, a third party device, an automated teller machine, a video teller machine, or another device capable of capturing a check image.

The third party system 260 includes a communication device 262 and an image capture device (not shown) communicably coupled with a processing device 264, which is also communicably coupled with a memory device 266. The processing device 264 is configured to control the communication device 262 such that the third party system 260 communicates across the network 230 with one or more other systems. The processing device 264 is also configured to access the memory device 266 in order to read the computer readable instructions 268, which in some embodiments includes a transaction application 270. The memory device 266 also includes a datastore 272 or database for storing pieces of data that can be accessed by the processing device 264.

In some embodiments, the capture application 220, the online banking application 221, and the transaction application 270 interact with the OCR engines 250 to receive or provide financial record images and data, detect and extract financial record data from financial record images, analyze financial record data, and implement business strategies, transactions, and processes. The OCR engines 250 and the client keying application 251 may be a suite of applications for conducting OCR and/or a computer system associated with a representative for keying in aspects of the received negotiable instrument.

The applications 220, 221, 250, 251, and 270 are for instructing the processing devices 214, 244 and 264 to perform various steps of the methods discussed herein, and/or other steps and/or similar steps. In various embodiments, one or more of the applications 220, 221, 250, 251, and 270 are included in the computer readable instructions stored in a memory device of one or more systems or devices other than the systems 260 and 240 and the check deposit device 211. For example, in some embodiments, the application 220 is stored and configured for being accessed by a processing device of one or more third party systems 292 connected to the network 230. In various embodiments, the applications 220, 221, 250, 251, and 270 stored and executed by different systems/devices are different. In some embodiments, the applications 220, 221, 250, 251, and 270 stored and executed by different systems may be similar and may be configured to communicate with one another, and in some embodiments, the applications 220, 221, 250, 251, and 270 may be considered to be working together as a singular application despite being stored and executed on different systems.

In various embodiments, one of the systems discussed above, such as the financial institution system 240, is more than one system and the various components of the system are not collocated, and in various embodiments, there are multiple components performing the functions indicated herein as a single device. For example, in one embodiment, multiple processing devices perform the functions of the processing device 244 of the financial institution system 240 described herein. In various embodiments, the financial institution system 240 includes one or more of the external systems 296 and/or any other system or component used in conjunction with or to perform any of the method steps discussed herein. For example, the financial institution system 240 may include a financial institution system, a credit agency system, and the like.

In various embodiments, the financial institution system 240, the third party system 260, and the check deposit device 211 and/or other systems may perform all or part of a one or more method steps discussed above and/or other method steps in association with the method steps discussed above. Furthermore, some or all the systems/devices discussed here, in association with other systems or without association with other systems, in association with steps being performed manually or without steps being performed manually, may perform one or more of the steps of method 300, the other methods discussed below, or other methods, processes or steps discussed herein or not discussed herein.

Figure 2:
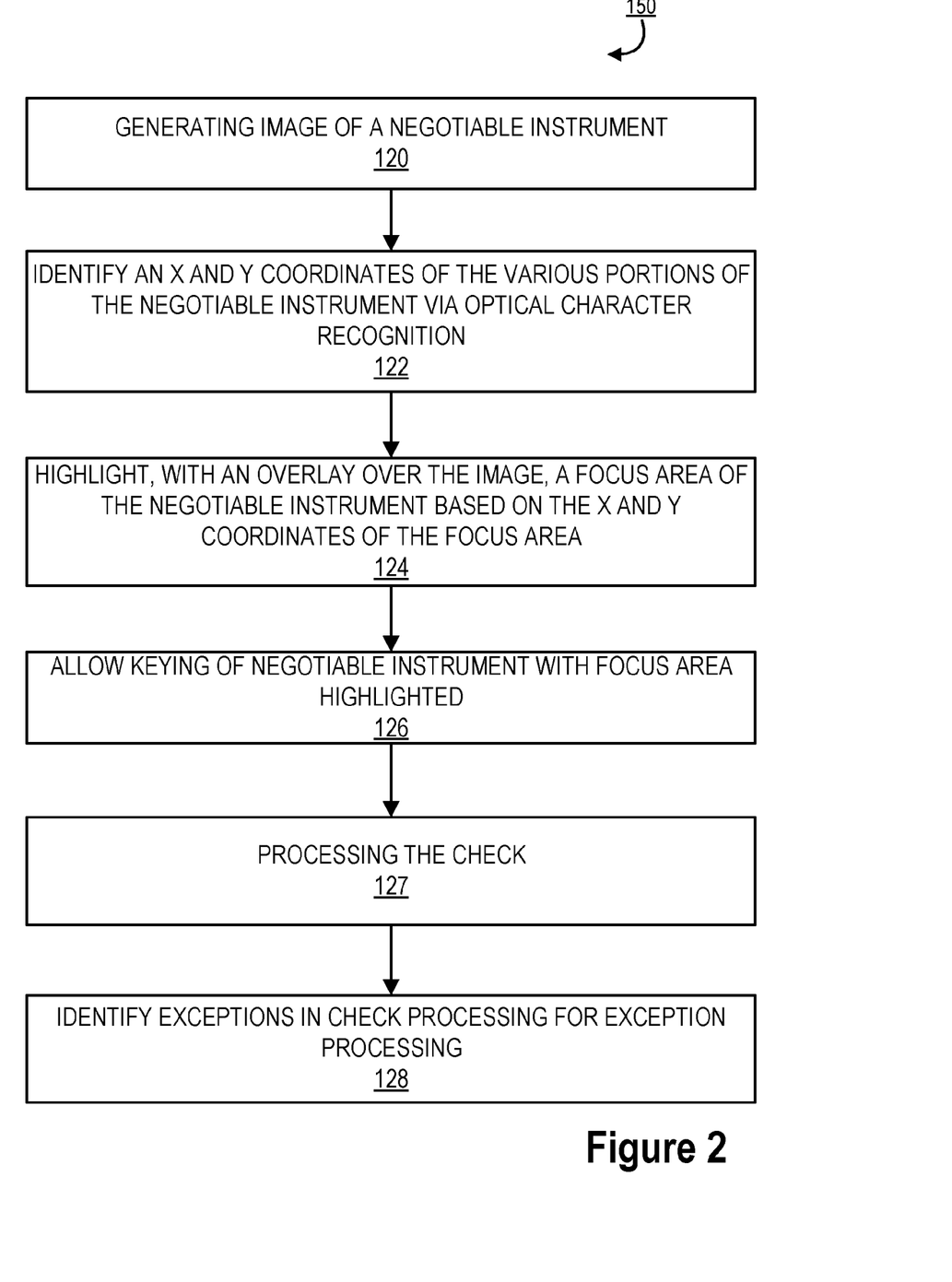
FIG. 2 provides a high level process flow illustrating a process for negotiable instrument overlaying for a keying display, in accordance with one embodiment of the present invention.

FIG. 2 presents provides a high level process flow illustrating a process for negotiable instrument overlaying for a keying display 150, in accordance with some embodiments of the invention. As illustrated in block 120, the method comprises receiving an image of a check or other negotiable instrument and generating an image of the negotiable instrument. The image received may be one or more of a check, other document, payment instrument, and/or financial record. In some embodiments, the image of the check may be received by a specialized apparatus associated with the financial institution (e.g. a computer system) via a communicable link to a user's mobile device, a camera, an Automated Teller Machine (ATM) at one of the entity's facilities, a second apparatus at a teller's station, another financial institution, or the like. In other embodiments, the apparatus may be specially configured to capture the image of the check for storage and exception processing. The system may then lift indicia in the form of data off of the check using optical character recognition (OCR). The OCR processes enables the system to convert text and other symbols in the check images to other formats such as text files and/or metadata, which can then be used and incorporated into a variety of applications, documents, and processes. In some embodiments, OCR based algorithms used in the OCR processes incorporate pattern matching techniques. For example, each character in an imaged word, phrase, code, or string of alphanumeric text can be evaluated on a pixel-by-pixel basis and matched to a stored character. Various algorithms may be repeatedly applied to determine the best match between the image and stored characters.

After the successful retrieval or capture of the image of the check, the process 150 may continue by identifying an X and Y coordinates for the various portions of the negotiable instrument via OCR as illustrated in block 122. In this way, each indicia associated with the negotiable instrument, such as data related to the payor, payment accounts, or payee may be identified with an X and Y axis value relative to the negotiable instrument. As such the Y axis may be a vertical axis associated with a vertical portion of the negotiable instrument and the X axis may be a horizontal axis associated with the horizontal portion of the negotiable instrument. Each axis is plotted with one or more numbers associated with steps up or across the axis. Each number in correlation with the opposing axis number generates a coordinate associated with that particular point on the negotiable instrument. In this way, the X and Y axis generation allows for mapping of coordinates of various indicia on the negotiable instrument. The apparatus may capture individual pieces of check information from the image of the check as indicia and in metadata form. In some embodiments, the check information may be text. In other embodiments, the check information may be an image processed into a compatible data format.

In some embodiments, the system may store the check information and corresponding coordinate data for each element or indicia identified on the check. After the image of the check is processed, the apparatus may store the coordinates and collected check information in a compatible data format. In some embodiments, the check information may be stored as metadata. As such, individual elements of the check information may be stored separately, and may be associated with each other via metadata. In some embodiments, the individual pieces of check information may be stored together. In some embodiments, the apparatus may additionally store the original image of the check immediately after the image of the check is received.

Utilizing the coordinates identified using the OCR engine, the system may be able to highlight, with an overlay over the image of the negotiable instrument, one or more focus areas of the negotiable instrument, as illustrated in block 124. In this way, the system may highlight, block out, gray out, cover, or the like locations of the check in order to aid a representative viewing the check. As such, upon being placed in the queue and when next in line to be viewed by a representative, the system may perform the overlay based on a code for which indicia and what overlay for that indicia is desired for that particular negotiable instrument. For example, the system may highlight indicia such as the legal amount field for a representative to easily identify the legal amount and to key that amount. In other embodiments, the system may blur or black out information such as non-public information for the check so that a representative does not see the information.

Once presented to the representative, the system highlights a focus area, allowing the keying of the negotiable instrument with the focus area highlighted, as illustrated in block 126. As such, the system presents the negotiable instrument to the representative for keying with the overlay. The representative may key the negotiable instrument and the overlay may be removed upon storage of the negotiable instrument after keying. Next, as illustrated in block 127 the system may continue to process the negotiable instrument.

Finally, if necessary the process 150 may continue to identify exceptions in the negotiable instrument processing for subsequent exception processing, as illustrated in block 128. Exceptions may be one or more irregularities in indicia of the check such as bad micro line reads, outdated document stock, misrepresented items, or the like that result in a failure to match the document to an account. In some embodiments, the process may also detect duplicate documents. In yet other embodiments, the system may identify payment stops for specific documents. The exceptions may be batched for processing them for resource review.

Figure 3:
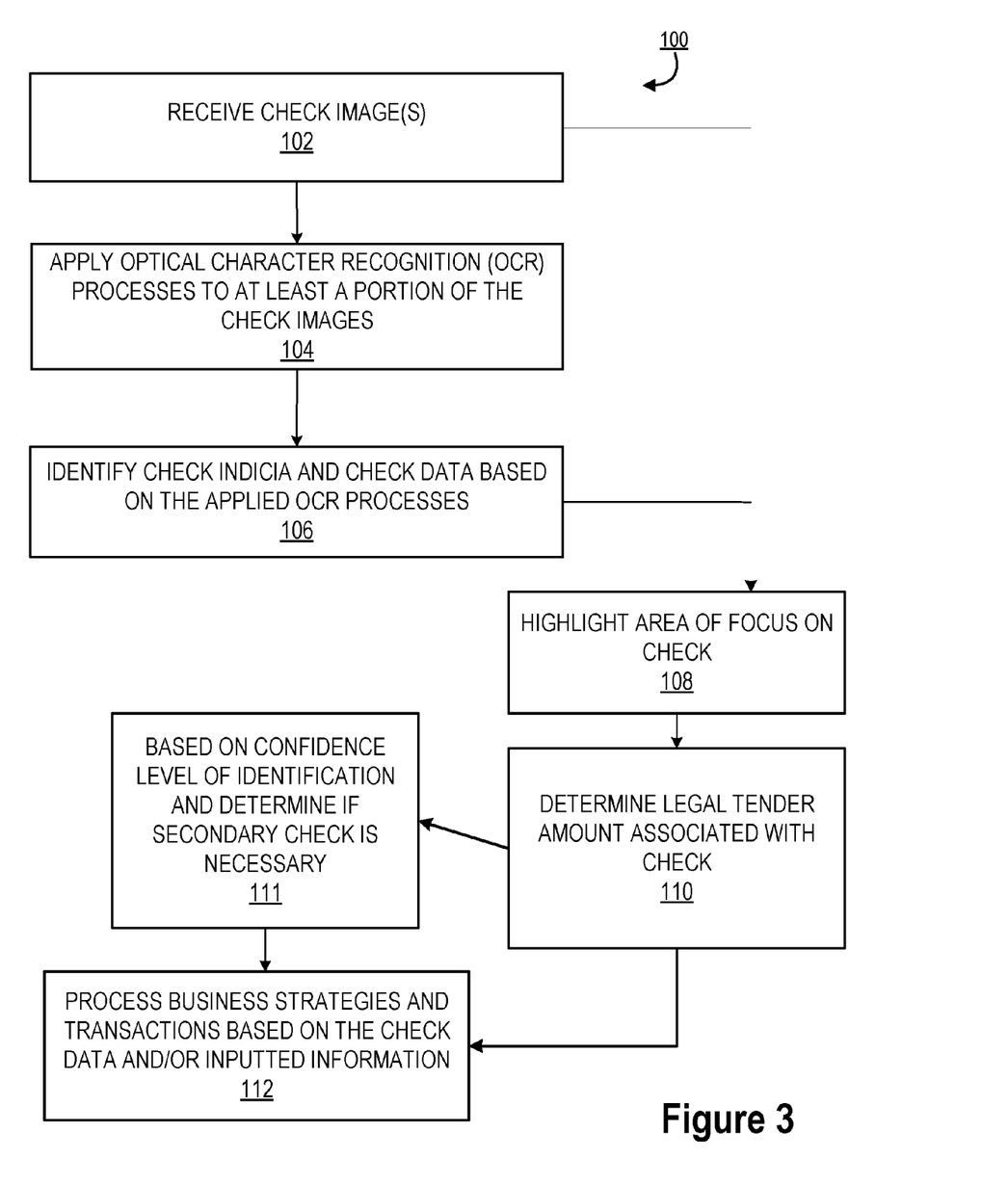
FIG. 3 provides a process flow illustrating a process for highlighting a negotiable instrument, in accordance with one embodiment of the present invention.

FIG. 3 illustrates a process flow for highlighting a negotiable instrument 100, in accordance with one embodiment of the present invention. As illustrated in block 102, the process 100 starts by receiving a check or negotiable instrument image. In some embodiments, the system may receive a paper version of the check and scan the check to generate an image. The system may store the check image.

The check images comprise the front portion of a check, the back portion of a check, or any other portions of a check. In cases where there are several checks piled into a stack, the multiple check images may include, for example, at least a portion of each of the four sides of the check stack. In this way, any text, numbers, or other data provided on any side of the check stack may also be used in implementing the process 100. In some embodiments the system may receive financial documents, payment instruments, checks, or the likes.

In some embodiments, each of the check images comprises indicia that includes financial record data. The financial record data includes dates financial records are issued, terms of the financial record, time period that the financial record is in effect, identification of parties associated with the financial record, payee information, payor information, obligations of parties to a contract, purchase amount, loan amount, consideration for a contract, representations and warranties, product return policies, product descriptions, check numbers, document identifiers, account numbers, merchant codes, file identifiers, source identifiers, and the like.

Although check images are illustrated in FIG. 5 through FIG. 8, it will be understood that any type of financial record image or negotiable instrument image may be received. Exemplary check images include PDF files, scanned documents, digital photographs, and the like. At least a portion of each of the check images, in some embodiments, is received from a financial institution, a merchant, a signatory of the financial record (e.g., the entity having authority to endorse or issue a financial record), and/or a party to a financial record. In other embodiments, the check images are received from image owners, account holders, agents of account holders, family members of account holders, financial institution customers, payors, payees, third parties, and the like. In some embodiments, the source of at least one of the checks includes an authorized source such as an account holder or a third party financial institution. In other embodiments, the source of at least one of the checks includes an unauthorized source such as an entity that intentionally or unintentionally deposits or provides a check image to the system of process 100.

In some embodiments, a customer or other entity takes a picture of a check at a point of sales or an automated teller machine (ATM) and communicates the resulting check image to a point of sales device or ATM via wireless technologies, near field communication (NFC), radio frequency identification (RFID), and other technologies. In other examples, the customer uploads or otherwise sends the check image to the system of process 100 via email, short messaging service (SMS) text, a web portal, online account, mobile applications, and the like. For example, the customer may upload a check image to deposit funds into an account or pay a bill via a mobile banking application using a capture device. The capture device can include any type or number of devices for capturing images or converting a check to any type of electronic format such as a camera, personal computer, laptop, notebook, scanner, mobile device, and/or other device. In some embodiments, the system may receive a paper version of the check and generate an image of the check from the paper version received.

Next, as illustrated in block 104, the process 100 continues by applying OCR to at least a portion of the check images. At least one OCR process may be applied to each of the check images or some of the check images. The OCR processes enables the system to convert text and other symbols in the check images to other formats such as text files and/or metadata, which can then be used and incorporated into a variety of applications, documents, and processes. In some embodiments, OCR based algorithms used in the OCR processes incorporate pattern matching techniques. For example, each character in an imaged word, phrase, code, or string of alphanumeric text can be evaluated on a pixel-by-pixel basis and matched to a stored character. Various algorithms may be repeatedly applied to determine the best match between the image and stored characters. In some embodiments, the OCR process includes identifying location fields for determining the position of data on the check image. The location fields or indicia are identified in the OCR by identifying an X and Y coordinates of the indicia on the check. Based on the position of the data using the X and Y coordinates, the system can identify the type of data in the location fields to aid in character recognition. For example, an OCR engine may determine that text identified in the upper right portion of a check image corresponds to a check number. The location fields can be defined using any number of techniques.

Next, as illustrated in block 106, the process 100 continues by identifying the check indicia and check data based on the applied OCR process. The applied OCR process may also identify an X and Y axis points for each item or indicia on the check. In this way, the system may know the coordinates of each corner of an indicia in order to know an exact location of the indicia on the negotiable instrument. As such, the system uses a grid system to identify non-data and data elements of a check image. The grid system may be similar to a quadrant system. Using the grid system, the system identifies the position of each grid element using a coordinate system (e.g., x and y coordinates or x, y, and z coordinate system or the like) or similar system for identifying the spatial location of a grid element on a check. In practice, the spatial location of a grid element may be appended to or some manner related to grid elements with check data. For example, using the grid, the system may identify which grid elements of the grid contain data elements, such as check amount and payee name, and either at the time of image capture or extraction of the check image within the grid, the system can tag the grid element having the check data element with the grid element's spatial location. In some embodiments, the grid system and/or quadrant system is based on stock check templates obtained from check manufacturers or merchants.

In addition to OCR processes, the system of process 100 can use other techniques such as image overlay to locate, identify, and extract data from the check images. In other embodiments, the system uses the magnetic ink character recognition (MICR) to determine the position of non-data (e.g., white space) and data elements on a check image. For example, the MICR of a check may indicate to the system that the received or captured check image is a business check with certain dimensions and also, detailing the location of data elements, such as the check amount box or payee line. In such an instance, once the positions of this information is made available to the system, the system will know to capture any data elements to the right or to the left of the identified locations or include the identified data element in the capture. This system may choose to capture the data elements of a check in any manner using the information determined from the MICR number of the check.

As illustrated in block 108, the process 100 continues by highlighting an area of focus, such as an indicia, on the check based on the X and Y coordinates of the corners of the indicia. The highlight may be a line around the indicia, a transparent colored box overlay over the indicia, or the like. The highlight may be a bright color or alternatively items that draw attention to the area of the negotiable instrument being highlighted. The highlighting may occur in real-time as the negotiable instrument is being presented to a representative for visualization. In some embodiments, once the representative has viewed the negotiable instrument, the highlight may be removed from the negotiable instrument for storage. In this way, the system overlays a highlight on a display of a representative for visualization of the negotiable instrument for keying purposes.

Once highlighted, the negotiable instrument may be presented to the representative via a display. As illustrated in block 110, the representative may determine a legal tender amount associated with the negotiable instrument. In this way, the representative may key one or more amounts or other aspects highlighted by the system. This may include a legal tender amount, a name, terms, or the like that the system has identified and highlighted based on coded instructions for the representative to key. As illustrated in block 111, once keyed the system may determine a confidence level of the identification and determine if a secondary check of the negotiable instrument is necessary. As such, based on a confidence level, the system may require additional checking to confirm the accuracy of the identification of the highlighted portion from the check.

Finally, as illustrated in block 112, business strategies and transactions are processed based on at least one of the check data and the inputted information. Data extracted from the check images using the process 100 may be used to automate or enhance various processes such as remediating exception processes, replacing check images with check data in online statements, enforcing requirements regarding third party check deposits, facilitating check to automated clearing house transaction conversion, cross selling products, and so forth.

Figure 4:
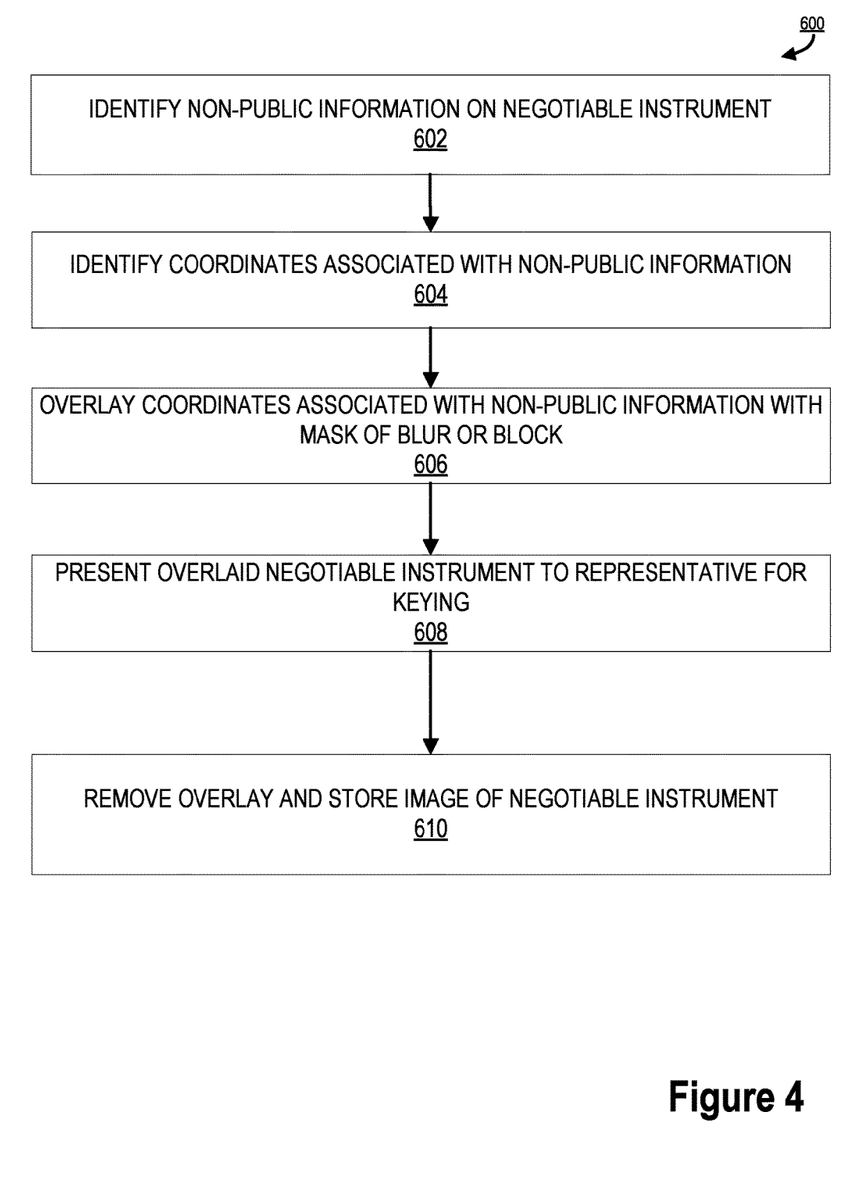
FIG. 4 provides a process flow illustrating a process for masking a negotiable instrument, in accordance with one embodiment of the present invention.

FIG. 4 illustrates a process flow for masking a negotiable instrument 600, in accordance with one embodiment of the invention. As illustrated in block 602, the process 600 is initiated by the identification of non-public information on the negotiable instrument. Non-public information may be any information on the negotiable instrument that is not desired to be distributed publicly, such as account numbers, terms of a contract, prices, or the like. The system, in some embodiments may be coded for overlaying of a blur or box over specific portions of non-public information. In this way, a user may code that a specific type of negotiable instrument requires an overlay over non-public information. As such, upon processing the negotiable instrument through an OCR channel, the system may identify that the negotiable instrument is one that has been coded for overlay.

As illustrated in block 604, the system may then identify the coordinates associated with the non-public information on the negotiable instrument coded for the overlay. The coordinates are the X, Y, and/or Z axis of the negotiable instrument image on a grid pattern. This way, four or more coordinate points are used to outline the boundary of the indicia for that is queued for receiving the overlay.

Once the coordinates are identified, the system may overlay or blur the area within the coordinate points defining the non-public information, as illustrated in block 606. In some embodiments, the non-public information may be blurred via an overlay process, such that an individual viewing the negotiable instrument at that time will not be able to identify the non-public information under the blur. In other embodiments, the non-public information may be covered with a solid overlay block. This block may be a solid color, such as gray, white, black, or the like. In this way, the non-public information may be blocked out with the overlay such that an individual viewing the negotiable instrument at that time will not be able to identify the non-public information.

As illustrated in block 608, once an overlay, whether a blur or a block, has been positioned according to the coordinate points of the non-public information, the negotiable instrument may be presented to a representative for keying of the negotiable instrument. In this way, upon being next in the queue for a representative, the negotiable instrument image may be overlaid based on code input for real-time presentation of an overlaid negotiable instrument on the representative's display. Finally, as illustrated in block 610, once the representative has keyed the negotiable instrument, the system may remove the overlay and store the image of the negotiable instrument without the overlay.

Figure 5:
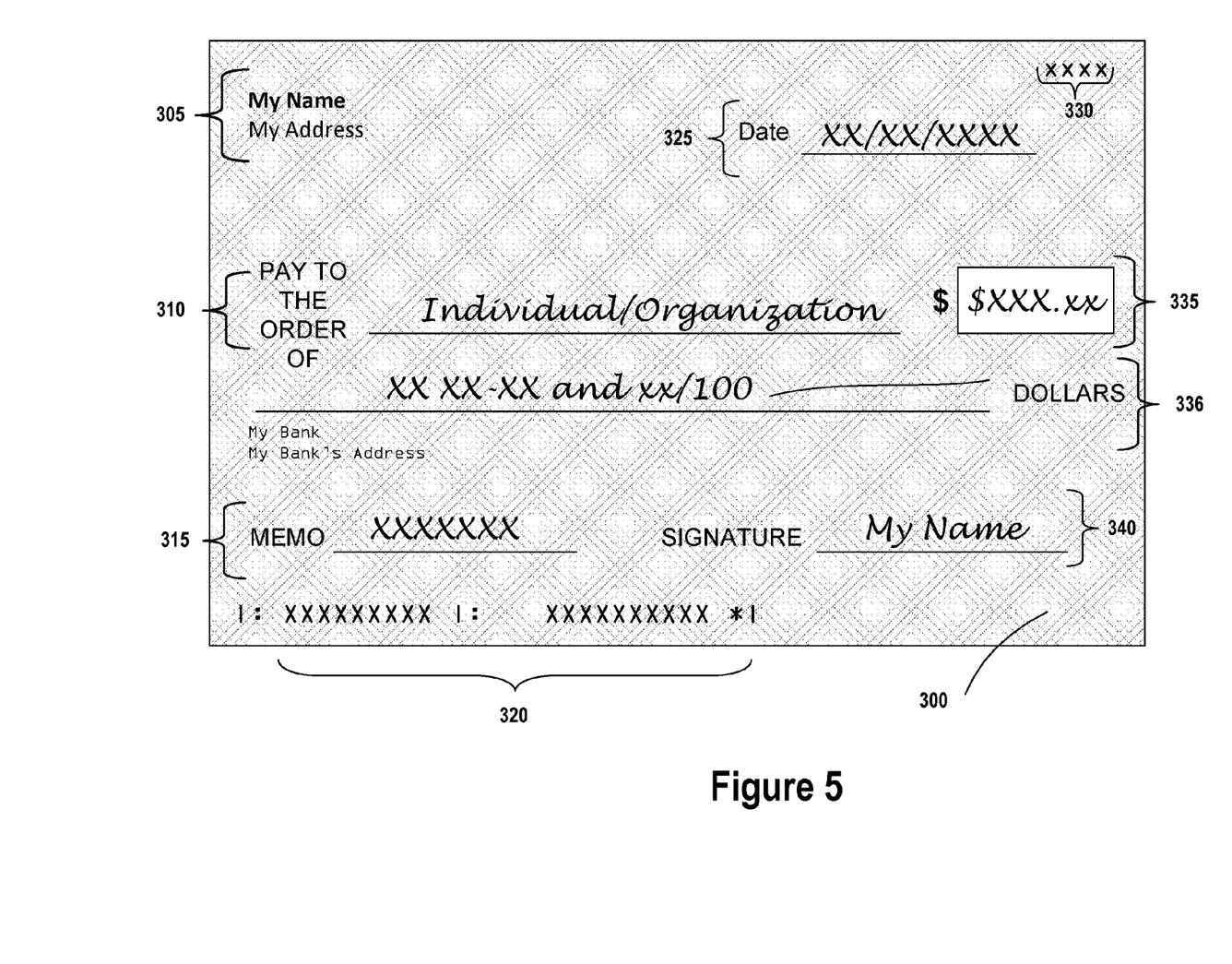
FIG. 5 illustrates an exemplary image of a negotiable instrument, in accordance with one embodiment of the present invention.

FIG. 5 provides an illustration of an exemplary image of a negotiable instrument 300, in accordance with one embodiment of the present invention. The negotiable instrument illustrated in FIG. 5 is a check. However, one will appreciate that any financial record, financial document, payment instrument, or the like may be provided as a negotiable instrument.

The image of check 300 may comprise an image of the entire check, a thumbnail version of the image of the check, individual pieces of check information, all or some portion of the front of the check, all or some portion of the back of the check, or the like. Check 300 comprises check information, wherein the check information comprises contact information 305, the payee 310, the memo description 315, the account number and routing number 320 associated with the appropriate user or customer account, the date 325, the check number 330, the amount of the check 335, the legal tender amount 336, the signature 340, or the like. In some embodiments, the check information may comprise text. In other embodiments, the check information may comprise an image. A capture device may capture an image of the check 300 and transmit the image to a system of a financial institution via a network. The system may collect the check information from the image of the check 300 as a grid system with X and Y points for each indicia identified on the check and store the check information in a datastore as metadata. In some embodiments, the pieces of check information may be stored in the datastore individually. In other embodiments, multiple pieces of check information may be stored in the datastore together.

Figure 6:
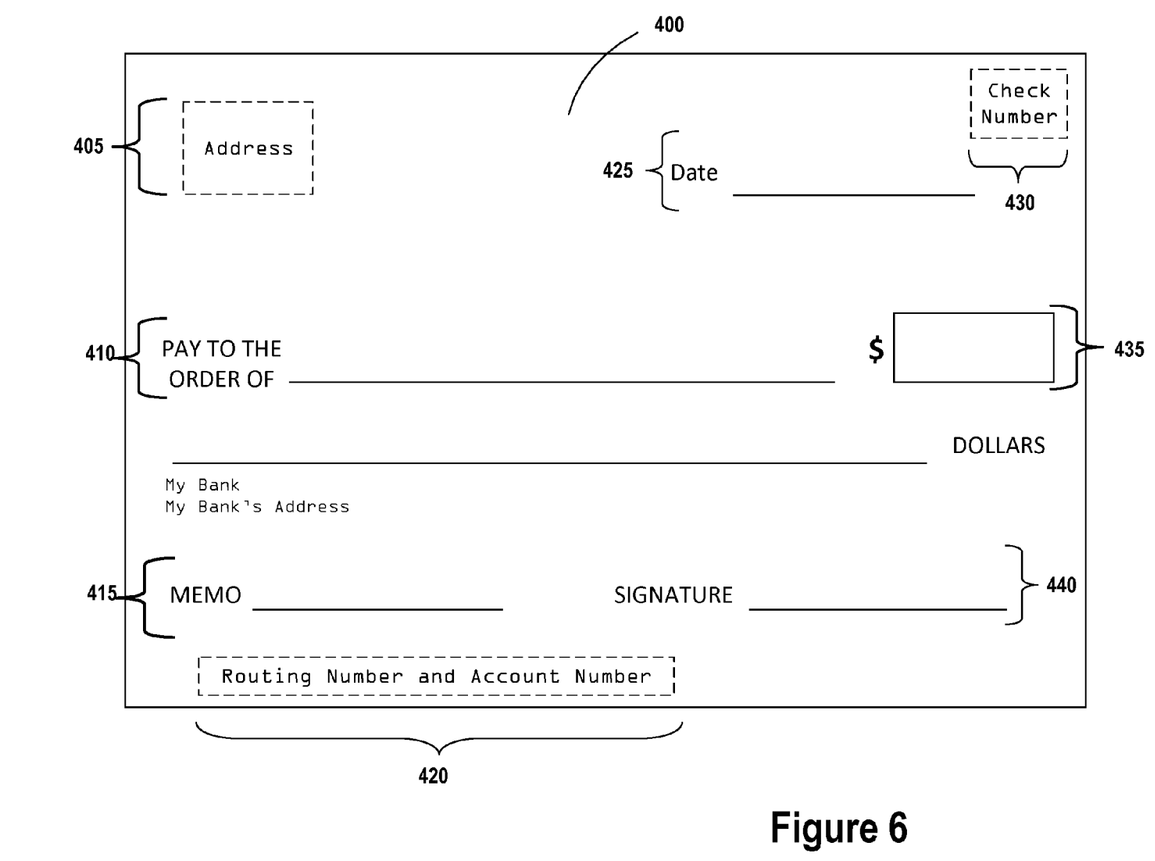
FIG. 6 provides an exemplary template of a negotiable instrument, in accordance with one embodiment of the present invention.

FIG. 6 illustrates an exemplary template of a negotiable instrument 400, in accordance with one embodiment of the present invention. Again, the negotiable instrument illustrated in FIG. 6 is a check. However, one will appreciate that any negotiable instrument such as a financial record, financial document, payment instruments, or the like may be provided.

In the illustrated embodiment, the check template 400 corresponds to the entire front portion of a check, but it will be understood that the check template 400 may also correspond to individual pieces of check information, portions of a check, or the like. The check template, in some embodiments, includes the format of certain types of checks associated with a bank, a merchant, an account holder, types of checks, style of checks, check manufacturer, and so forth. By using the check template, the system may "learn" to map via a grid the key attributes of the check for faster and more accurate processing of coordinates of a negotiable instrument. In some embodiments, negotiable instrument are categorized by template. The check template 400 is only an exemplary template for a negotiable instrument, and other check templates or other financial record templates may be utilized to categorize checks or other financial records. The check template 400 can be used in the OCR processes, image overlay techniques, and the like.

The check template 400 comprises check information, wherein the check information includes, for example, a contact information field 405, a payee line field 410, a memo description field 415, an account number and routing number field 420 associated with the appropriate user or customer account, a date line field 425, a check number field 430, an amount box field 435, a signature line field 440, or the like.

Figure 7:
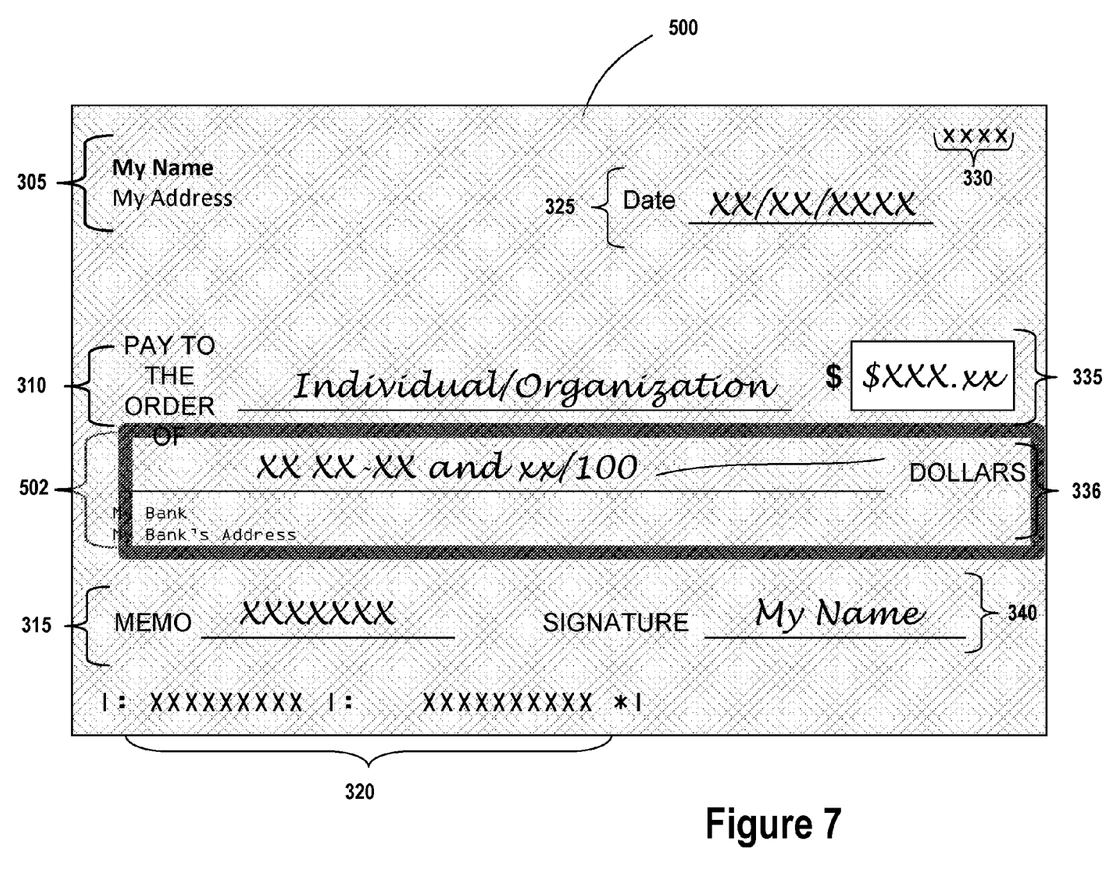
FIG. 7 provides an exemplary image of a negotiable instrument with a highlighted focus indicia, in accordance with one embodiment of the present invention.

FIG. 7 provides an exemplary image of a negotiable instrument with a highlighted focus indicia 500, in accordance with one embodiment of the present invention. The negotiable instrument illustrated in FIG. 7 is a check. However, one will appreciate that any negotiable instrument including a financial record, financial document, payment instrument, or the like may be provided as a negotiable instrument.

As illustrated, the image of check 500 may comprise an image of the entire check, a thumbnail version of the image of the check 500, individual pieces of check information, all or some portion of the front of the check, all or some portion of the back of the check, or the like. Check 500 comprises check information, wherein the check information comprises contact information 305, the payee 310, the memo description 315, the account number and routing number 320 associated with the appropriate user or customer account, the date 325, the check number 330, the amount of the check 335, the legal tender amount 336, the signature 340, or the like. In some embodiments, the check information may comprise text. In other embodiments, the check information may comprise an image. A capture device may capture an image of the check 500 and transmit the image to a system of a financial institution via a network. The system may collect the check information from the image of the check 500 as a grid system with X and Y points for each indicia identified on the check and store the check information in a datastore as metadata. In this case, the check 500 has been coded for a highlight 502 of the legal tender amount 336. In some embodiments, the highlight 502 may be a bright or noticeable color line outlining the coordinates associated with the legal tender amount 336. The highlight 502 may be presented on the display of a representative for keying the check 500. Once the check 500 has been keyed and has been removed from the display of the representative, the highlight 500 may be removed and the check 500 may be stored without the highlight 502.

The highlight 502 may be used to allow the representative to easily view the portion of the check 500 that he/she desires to key. This may be for keying check information, exception processing, or the like.

Figure 8:
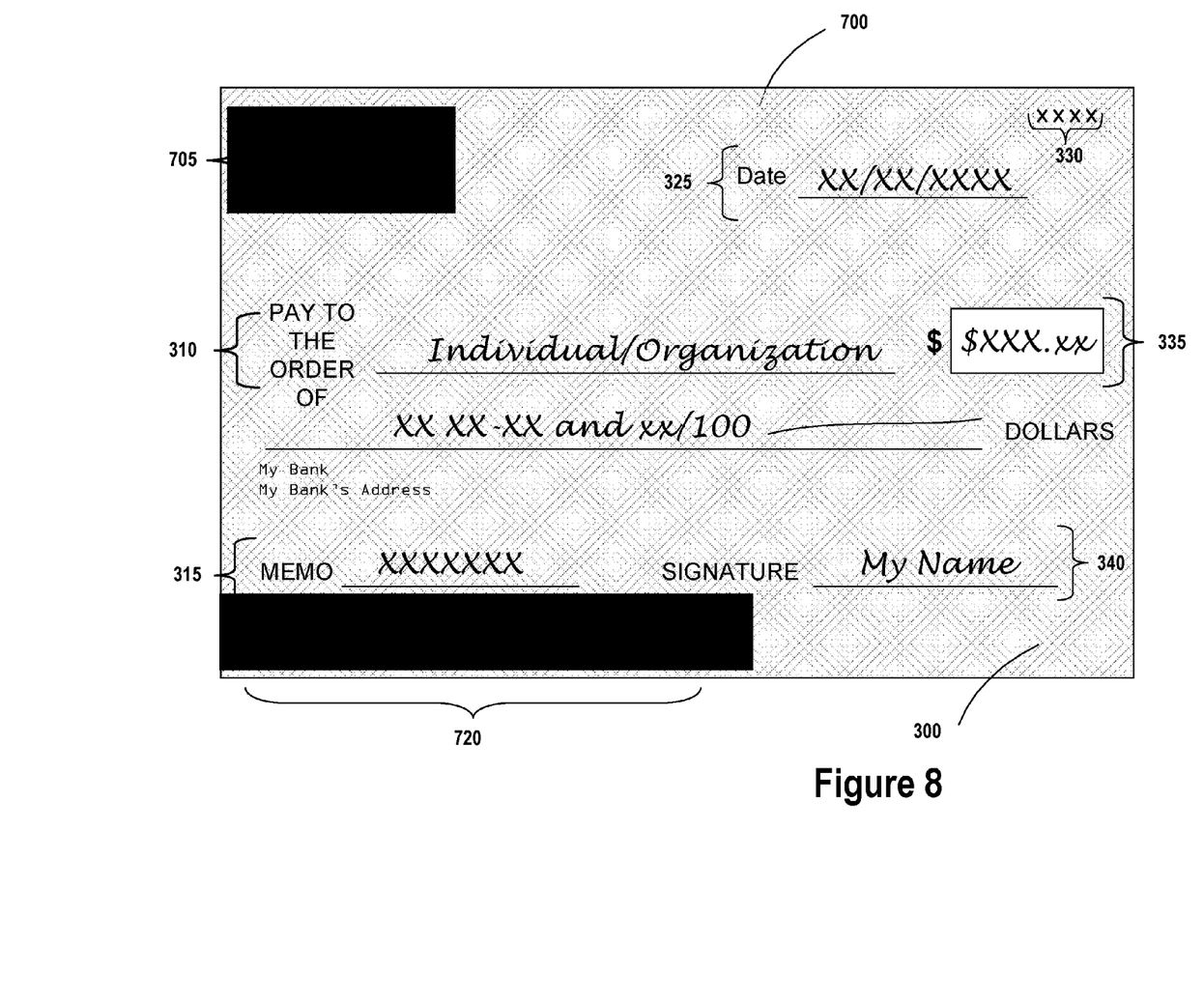
FIG. 8 provides an exemplary image of a negotiable instrument with a masked indicia, in accordance with one embodiment of the present invention.

FIG. 8 provides an exemplary image of a negotiable instrument with a highlighted focus indicia 700, in accordance with one embodiment of the present invention. The negotiable instrument illustrated in FIG. 8 is a check. However, one will appreciate that any negotiable instrument including a financial record, financial document, payment instrument, or the like may be provided as a negotiable instrument.

As illustrated, the image of check 700 may comprise an image of the entire check, a thumbnail version of the image of the check 700, individual pieces of check information, all or some portion of the front of the check, all or some portion of the back of the check, or the like. Check 700 comprises check information, wherein the check information comprises contact information, the payee 310, the memo description 315, the account number and routing number associated with the appropriate user or customer account, the date 325, the check number 330, the amount of the check 335, the legal tender amount 336, the signature 340, or the like. In some embodiments, the check information may comprise text. In other embodiments, the check information may comprise an image. A capture device may capture an image of the check 700 and transmit the image to a system of a financial institution via a network. The system may collect the check information from the image of the check 700 as a grid system with X and Y points for each indicia identified on the check and store the check information in a datastore as metadata. In this case, the check 700 has been coded for a mask of non-public information coordinates. In this way, the contact information, the account number, and the routing number have been masked using blocks based on the coordinates of the grid corresponding to those portions on the check 700. As illustrated in block 705 and block 720. In some embodiments, the blocks may be solid colors such as black or grey blocks. In other embodiments, the mask may be a blurred portion such that the non-public information isn't identifiable. In some embodiments, one or more indicia may be coded for masking. As illustrated in the example provided in FIG. 8, both the contact information has a block 705 and the account number and routing number have a block 720. One will appreciate that one or more non-public information coordinates may be coded for masking.

The masking may be used to prevent representatives and other uses from viewing non-public information. In this way, once the check 700 has been coded for masking, it will be masked upon queuing of the check 700 for visualization on a display of a representative or use. The system may present the check 700 with the overlay masks associated therewith to the representative via a display on the representative's device. Once the representative has reviewed the check 700, the check 700 may be stored without the coded mask.

In some embodiments, the stored data may be structural metadata. As such, the data may be about the design and specification of the structure of the data. In other embodiments, the data may be descriptive metadata. As such, the data may be data describing in detail the content of the financial record or document. In some embodiments, the metadata as described herein may take the form of structural, descriptive and/or a combination thereof.

Figure 9:
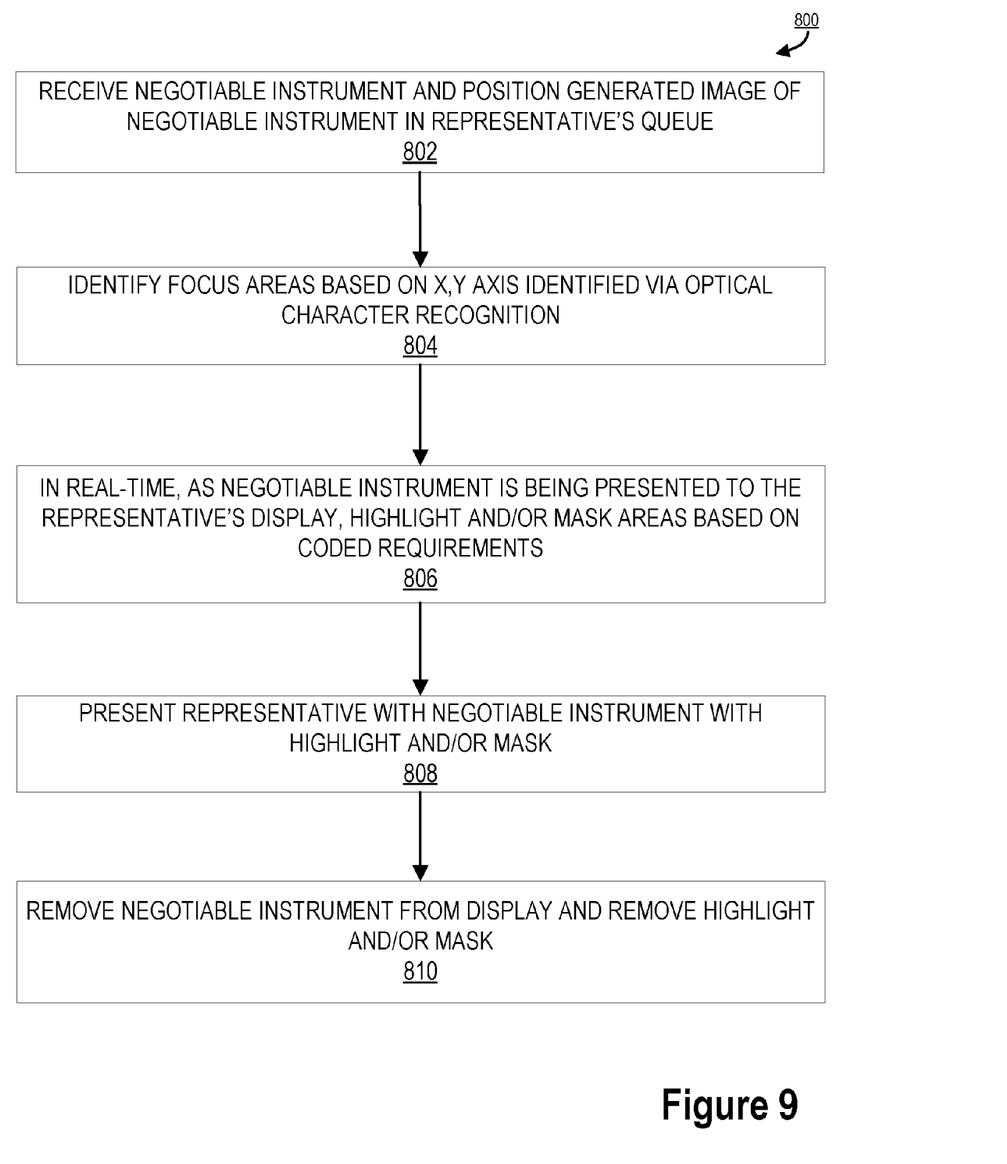
FIG. 9 provides a process flow illustrating the process of presenting a programmable overlay, in accordance with one embodiment of the present invention.

FIG. 9 illustrates a process flow for the process of presenting a programmable overlay 800, in accordance with one embodiment of the present invention. As illustrated in block 802, the process 800 is initiated by receiving a negotiable instrument and positioning a created image of the negotiable instrument into a queue for a representative. Next, as illustrated in block 804, the system may identify an overlay in the form of a focus area or mask area within the negotiable instrument based on an X and Y axis identified via OCR. The identified areas for overlaying a mask or highlight may be coded based on the negotiable instrument. In some embodiments the coding may be for specific negotiable instruments or types of negotiable instruments. In this way, the system may identify the type of negotiable instrument then identify the focus area or mask areas for that negotiable instrument. In some embodiments, the coding may be negotiable instrument specific based on payee, payor, address, account number, or the like. In other embodiments, all negotiable instruments of the same type or template may be coded for an overlay. The OCR processing may identify the exact coordinates outlining each indicia for overlaying and the system, based on the coding, may position the overlay according to the OCR processing identified coordinates for the indicia.

Next, as illustrated in block 806, the process continues by presenting a highlighted or masked area of a negotiable instrument in real-time, as the negotiable instrument is being presented to the representative's display. In this way, as the negotiable instrument is being presented to the representative via the display, the system may present the overlay in the form of a mask or highlight in real-time as the negotiable instrument is being presented to the representative. As illustrated in block 808, the system may present, upon being queued, the representative with the negotiable instrument including the coded highlight or mask. Finally, as illustrated in block 810, after the representative has viewed and keyed the negotiable instrument the system may remove the negotiable instrument from the display and remove the highlight or mask overlay for storage of the image of the negotiable instrument.

As will be appreciated by one of ordinary skill in the art, the present invention may be embodied as an apparatus (including, for example, a system, a machine, a device, a computer program product, and/or the like), as a method (including, for example, a business process, a computer-implemented process, and/or the like), or as any combination of the foregoing. Accordingly, embodiments of the present invention may take the form of an entirely software embodiment (including firmware, resident software, micro-code, or the like), an entirely hardware embodiment, or an embodiment combining software and hardware aspects that may generally be referred to herein as a "system." Furthermore, embodiments of the present invention may take the form of a computer program product that includes a computer-readable storage medium having computer-executable program code portions stored therein. As used herein, a processor may be "configured to" perform a certain function in a verity of ways, including, for example, by having one or more general-purpose circuits perform the functions by executing one or more computer-executable program code portions embodied in a computer-readable medium, and/or having one or more application-specific circuits perform the function.

It will be understood that any suitable computer-readable medium may be utilized. The computer-readable medium may include, but is not limited to, a non-transitory computer-readable medium, such as a tangible electronic, magnetic, optical, infrared, electromagnetic, and/or semiconductor system, apparatus, and/or device. For example, in some embodiments, the non-transitory computer-readable medium includes a tangible medium such as a portable computer diskette, a hard disk, a random access memory (RAM), a read-only memory (ROM), an erasable programmable read-only memory (EPROM or Flash memory), a compact disc read-only memory (CD-ROM), and/or some other tangible optical and/or magnetic storage device. In other embodiments of the present invention, however, the computer-readable medium may be transitory, such as a propagation signal including computer-executable program code portions embodied therein.

It will also be understood that one or more computer-executable program code portions for carrying out operations of the present invention may include object-oriented, scripted, and/or unscripted programming languages, such as, for example, Java, Perl, Smalltalk, C++, SAS, SQL, Python, Objective C, and/or the like. In some embodiments, the one or more computer-executable program code portions for carrying out operations of embodiments of the present invention are written in conventional procedural programming languages, such as the "C" programming languages and/or similar programming languages. The computer program code may alternatively or additionally be written in one or more multi-paradigm programming languages, such as, for example, F#.

It will further be understood that some embodiments of the present invention are described herein with reference to flowchart illustrations and/or block diagrams of systems, methods, and/or computer program products. It will be understood that each block included in the flowchart illustrations and/or block diagrams, and combinations of blocks included in the flowchart illustrations and/or block diagrams, may be implemented by one or more computer-executable program code portions. These one or more computer-executable program code portions may be provided to a processor of a general purpose computer, special purpose computer, and/or some other programmable data processing apparatus in order to produce a particular machine, such that the one or more computer-executable program code portions, which execute via the processor of the computer and/or other programmable data processing apparatus, create mechanisms for implementing the steps and/or functions represented by the flowchart(s) and/or block diagram block(s).

It will also be understood that the one or more computer-executable program code portions may be stored in a transitory or non-transitory computer-readable medium (e.g., a memory, or the like) that can direct a computer and/or other programmable data processing apparatus to function in a particular manner, such that the computer-executable program code portions stored in the computer-readable medium produce an article of manufacture including instruction mechanisms which implement the steps and/or functions specified in the flowchart(s) and/or block diagram block(s).

The one or more computer-executable program code portions may also be loaded onto a computer and/or other programmable data processing apparatus to cause a series of operational steps to be performed on the computer and/or other programmable apparatus. In some embodiments, this produces a computer-implemented process such that the one or more computer-executable program code portions which execute on the computer and/or other programmable apparatus provide operational steps to implement the steps specified in the flowchart(s) and/or the functions specified in the block diagram block(s). Alternatively, computer-implemented steps may be combined with operator and/or human-implemented steps in order to carry out an embodiment of the present invention.

While certain exemplary embodiments have been described and shown in the accompanying drawings, it is to be understood that such embodiments are merely illustrative of, and not restrictive on, the broad invention, and that this invention not be limited to the specific constructions and arrangements shown and described, since various other changes, combinations, omissions, modifications and substitutions, in addition to those set forth in the above paragraphs, are possible. Those skilled in the art will appreciate that various adaptations and modifications of the just described embodiments can be configured without departing from the scope and spirit of the invention. Therefore, it is to be understood that, within the scope of the appended claims, the invention may be practiced other than as specifically described herein.

What is claimed is:

1. A system for a programmable overlay for negotiable instrument image processing, said system comprising:
    at least one electronic computing device;
    at least one electronic storage device; and
    computer program instruction code stored in said electronic storage device, wherein said computer program instruction code is structured to cause said at least one electronic computing device to:
    receive an image of a negotiable instrument and position the image of the negotiable instrument in queue for representative keying;
    generate a grid of the negotiable instrument;
    identify axis coordinates for one or more parameter points of indicia on the image of the negotiable instrument;
    identify focus indicia for a representative of the image of the negotiable instrument;
    present on a display, in real-time upon being queued, an overlay of the image of the negotiable instrument, wherein the overlay comprises a highlight to or mask of the focus indicia and is positioned as an overlay over the image of the negotiable instrument based on the axis coordinates for the one or more parameter points of the focus indicia;
    allow representative keying of the image of the negotiable instrument with the overlay highlight or mask over the focus indicia; and
    remove the overlay upon completion of keying and store the image of the negotiable instrument and axis coordinates for the one or more parameter points of the indicia without the overlay.

2. The system of claim 1, further comprising coding, based on identification of a type of negotiable instrument the image of a negotiable instrument is, the overlay as being the highlight or the mask of the focus indicia.

3. The system of claim 1, wherein the mask of the focus indicia comprises a burr or block completely covering the focus indicia, such that the focus indicia is not visible by the representative on the display.

4. The system of claim 1, wherein the highlight of the focus indicia comprises a highlight box visually attracting the focus indicia to the representative on the display.

5. The system of claim 1, wherein the axis coordinates are an X and Y axis point based on the generated grid of the negotiable instrument that identify one or more outside parameter points for each of the indicia located on a front and a back of the negotiable instrument.

6. The system of claim 1 further comprising identifying the indicia on the image of the negotiable instrument as areas on the negotiable instrument comprising non-public information, signatures, account numbers, routing numbers, and legal tender lines.

7. The system of claim 1, wherein receiving an image of the negotiable instrument further comprises generating an image of a paper version of the negotiable instrument in a format for optical character recognition.

8. The system of claim 1, wherein the mask is applied over focus indicia that includes non-public information, wherein the mask is applied over the axis coordinates for one or more parameter points of focus indicia that includes non-public information completely covering the non-public information.

9. The system of claim 1, wherein the highlight is applied over focus indicia that includes a legal tender line, wherein the highlight is applied over the axis coordinates for one or more parameter points of focus indicia that includes the legal tender line highlighting the legal tender line for representative keying.

10. A computer program product for a programmable overlay for negotiable instrument image processing, the computer program product comprising at least one non-transitory computer-readable medium having computer-readable program code portions embodied therein, the computer-readable program code portions comprising:
    an executable portion configured for receiving an image of a negotiable instrument and position the image of the negotiable instrument in queue for representative keying;
    an executable portion configured for generating a grid of the negotiable instrument;
    an executable portion configured for identifying axis coordinates for one or more parameter points of indicia on the image of the negotiable instrument;
    an executable portion configured for identifying focus indicia for a representative of the image of the negotiable instrument;
    an executable portion configured for presenting on a display, in real-time upon being queued, an overlay of the image of the negotiable instrument, wherein the overlay comprises a highlight to or mask of the focus indicia and is positioned as an overlay over the image of the negotiable instrument based on the axis coordinates for the one or more parameter points of the focus indicia;

an executable portion configured for allowing representative keying of the image of the negotiable instrument with the overlay highlight or mask over the focus indicia; and an executable portion configured for removing the overlay upon completion of keying and store the image of the negotiable instrument and axis coordinates for the one or more parameter points of the indicia without the overlay.

11. The computer program product of claim 10, further comprising an executable portion configured for coding, based on identification of a type of negotiable instrument the image of a negotiable instrument is, the overlay as being the highlight or the mask of the focus indicia.

12. The computer program product of claim 10, wherein the axis coordinates are an X and Y axis point based on the generated grid of the negotiable instrument that identify one or more outside parameter points for each of the indicia located on a front and a back of the negotiable instrument.

13. The computer program product of claim 10, wherein receiving an image of the negotiable instrument further comprises generating an image of a paper version of the negotiable instrument in a format for optical character recognition.

14. The computer program product of claim 10, wherein the mask is applied over focus indicia that includes non-public information, wherein the mask is applied over the axis coordinates for one or more parameter points of focus indicia that includes non-public information completely covering the non-public information.

15. The computer program product of claim 10, wherein the highlight is applied over focus indicia that includes a legal tender line, wherein the highlight is applied over the axis coordinates for one or more parameter points of focus indicia that includes the legal tender line highlighting the legal tender line for representative keying.

16. A computer-implemented method for a programmable overlay for negotiable instrument image processing, the method comprising:

providing a computing system comprising a computer processing device and a non-transitory computer readable medium, where the computer readable medium comprises configured computer program instruction code, such that when said instruction code is operated by said computer processing device, said computer processing device performs the following operations:

receiving an image of a negotiable instrument and position the image of the negotiable instrument in queue for representative keying;

generating a grid of the negotiable instrument;

identifying axis coordinates for one or more parameter points of indicia on the image of the negotiable instrument;

identifying focus indicia for a representative of the image of the negotiable instrument;

presenting on a display, in real-time upon being queued, an overlay of the image of the negotiable instrument, wherein the overlay comprises a highlight to or mask of the focus indicia and is positioned as an overlay over the image of the negotiable instrument based on the axis coordinates for the one or more parameter points of the focus indicia;

allowing representative keying of the image of the negotiable instrument with the overlay highlight or mask over the focus indicia; and removing the overlay upon completion of keying and store the image of the negotiable instrument and axis coordinates for the one or more parameter points of the indicia without the overlay.

17. The computer-implemented method of claim 16, further comprising coding, based on identification of a type of negotiable instrument the image of a negotiable instrument is, the overlay as being the highlight or the mask of the focus indicia.

18. The computer-implemented method of claim 16, wherein the axis coordinates are an X and Y axis point based on the generated grid of the negotiable instrument that identify one or more outside parameter points for each of the indicia located on a front and a back of the negotiable instrument.

19. The computer-implemented method of claim 16, wherein the mask is applied over focus indicia that includes non-public information, wherein the mask is applied over the axis coordinates for one or more parameter points of focus indicia that includes non-public information completely covering the non-public information.

20. The computer-implemented method of claim 16, wherein the highlight is applied over focus indicia that includes a legal tender line, wherein the highlight is applied over the axis coordinates for one or more parameter points of focus indicia that includes the legal tender line highlighting the legal tender line for representative keying.

* * * * *